US012715366B2

(12) United States Patent
Kang et al.

(10) Patent No.: US 12,715,366 B2
(45) Date of Patent: Aug. 25, 2026

(54) VEHICLE PROVIDED WITH STORAGE SPACE

(71) Applicants: Hyundai Motor Company, Seoul (KR); Kia Corporation, Seoul (KR)

(72) Inventors: Chang Hak Kang, Hwaseong-si (KR); Gookhyun Jeon, Seoul (KR); Chan Woong Jeon, Incheon (KR); Jaeseung Lee, Hwaseong-si (KR); Hyochul Myoung, Suwon-si (KR)

(73) Assignees: Hyundai Motor Company, Seoul (KR); ia Corporation, Seoul (KR)

( * ) Notice: Subject to any disclaimer, the term of this patent is extended or adjusted under 35 U.S.C. 154(b) by 477 days.

(21) Appl. No.: 18/461,117

(22) Filed: Sep. 5, 2023

(65) Prior Publication Data

US 2024/0198916 A1 Jun. 20, 2024

(30) Foreign Application Priority Data

Dec. 16, 2022 (KR) ........................ 10-2022-0177464

(51) Int. Cl.
*B60R 7/12* (2006.01)
*B62D 25/04* (2006.01)

(52) U.S. Cl.
CPC ................ *B60R 7/12* (2013.01); *B62D 25/04* (2013.01)

(58) Field of Classification Search
CPC ............... B60R 7/12; B60R 2011/0021; B60R 2011/0022; B60R 7/04; B62D 25/04
USPC ....................................................... 296/37.13
See application file for complete search history.

(56) References Cited

U.S. PATENT DOCUMENTS

| | | | | |
|---|---|---|---|---|
| 4,700,848 A * | 10/1987 | Fujiki | B60R 7/12 211/63 |
| 4,807,920 A * | 2/1989 | Fujiki | B60R 7/12 211/63 |
| 8,979,160 B1 * | 3/2015 | Pericak | E05B 83/30 224/544 |
| 11,772,566 B2 * | 10/2023 | Ostertag | B60R 9/02 296/37.13 |
| 2006/0028043 A1 * | 2/2006 | Zeidman | B60R 7/12 296/37.13 |
| 2007/0241582 A1 * | 10/2007 | McKeever | B60R 7/12 296/37.12 |

FOREIGN PATENT DOCUMENTS

| | | |
|---|---|---|
| JP | S62161059 U * | 10/1987 |
| JP | S62178242 U * | 11/1987 |
| JP | S62178243 U * | 11/1987 |
| JP | S62178245 U * | 11/1987 |
| JP | H0478045 U * | 7/1992 |
| JP | H0735192 U * | 6/1995 |
| JP | 2001063636 A * | 3/2001 |
| JP | 2021133805 A * | 9/2021 |
| JP | 2022050290 A * | 3/2022 |

* cited by examiner

*Primary Examiner* — Jason S Morrow
(74) *Attorney, Agent, or Firm* — Slater Matsil, LLP

(57) ABSTRACT

An embodiment vehicle includes a vehicle body, a door coupled to the vehicle body and including a door end portion extending in a length direction of the vehicle body, and a side outer panel mounted on an outside of the vehicle body, the side outer panel including a storage side bent toward an inside of the vehicle body to define a storage space.

20 Claims, 12 Drawing Sheets

VEHICLE PROVIDED WITH STORAGE SPACE

CROSS-REFERENCE TO RELATED APPLICATIONS

This application claims the benefit of Korean Patent Application No. 10-2022-0177464, filed on Dec. 16, 2022, which application is hereby incorporated herein by reference.

TECHNICAL FIELD

The present invention relates to a vehicle in which a storage space is formed.

BACKGROUND

Various types of storage spaces are formed in a vehicle according to the needs of the occupant riding in the vehicle.

Demand for a space for storing long items such as an umbrella among spaces for storing occupant items inside a vehicle is increasing.

However, when the umbrella is stored inside the vehicle, the humidity inside the vehicle increases, which increases the operating time of an air conditioner or HVAC (heating, ventilation, & air conditioning) system for humidity control. Especially in the case of electric vehicles, the increase in HVAC operation time causes a reduction in the AER (all electric range).

In addition, in order to secure the storage space for umbrellas, there is a concern about deteriorated indoor space, and there is a possibility of bacterial propagation due to water accumulation in the vehicle or corrosion of parts, and there is a risk of occupant slipping or floor decay due to retention.

The above information disclosed in this background section is only for enhancement of understanding of the background of embodiments of the invention, and therefore it may contain information that does not form the prior art that is already known to a person of ordinary skill in the art.

SUMMARY

The present invention relates to a vehicle in which a storage space is formed. Particular embodiments relate to a vehicle provided with a storage space between a door and a vehicle body.

Embodiments of the present disclosure provide a vehicle provided with a storage space between the door and the vehicle body.

A vehicle provided with a storage space according to an exemplary embodiment may include a door formed with a door end portion extending in the length direction of a vehicle body and a side outer panel mounted on the outside of the vehicle body and having a storage side bent toward the inside of the vehicle body to form a storage space.

The storage space may be formed between the door end portion and the storage side when the door is closed.

The vehicle according to an exemplary embodiment may further include a side inner panel mounted inside the vehicle body and connected to the storage side and a pillar portion mounted inside the side outer panel and the side inner panel.

The vehicle according to an exemplary embodiment may further include a storage holder mounted on the storage side.

The storage holder may be mounted on the pillar portion through the storage side.

The storage holder may be a storage holder for mounting an umbrella.

The storage holder may include a guide rail, of which a position fixing part is formed thereto and mounted on the vehicle body, and a holder portion selectively fixed to the position fixing part.

The holder portion may include an upper holder on which a holder ring is formed and a lower holder on which a funnel is formed.

The vehicle according to an exemplary embodiment may further include a drainage passage formed on the side outer panel to exhaust water to the outside of the vehicle.

The vehicle according to an exemplary embodiment may further include an outer weather strip sealing between the door end portion and the side outer panel.

The vehicle according to an exemplary embodiment may further include an inner weather strip sealing between the inner end of the side outer panel and the door.

The vehicle according to an exemplary embodiment may further include a lower weather strip sealing between the lower portion of the vehicle body and the lower portion of the door.

According to the vehicle provided with a storage space according to an exemplary embodiment, a storage space is formed between a door and a vehicle body, so space utilization may be increased.

According to the vehicle provided with a storage space according to an exemplary embodiment, space utilization may be increased by storing an umbrella in the storage space, and an increase in humidity inside the vehicle may be suppressed.

In addition, the effects that can be obtained or predicted due to the embodiments of the present invention will be directly or implicitly disclosed in the detailed description of the embodiments of the present invention. That is, various effects expected according to embodiments of the present invention will be disclosed within the detailed description to be described later.

BRIEF DESCRIPTION OF THE DRAWINGS

Since these drawings are for reference in explaining exemplary embodiments of the present invention, the technical idea of the present invention should not be construed as being limited to the accompanying drawings.

Figure 1:
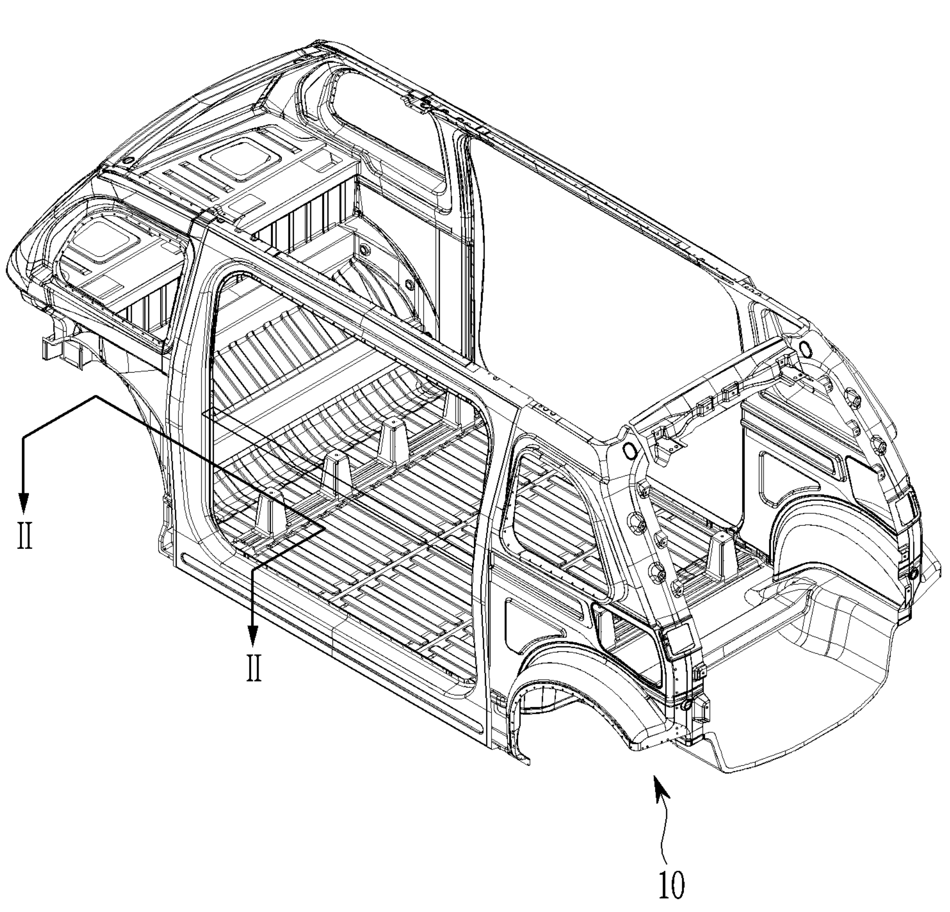
FIG. 1 is a partial perspective view of a vehicle provided with a storage space according to an exemplary embodiment of the present invention.

The following reference identifiers may be used in connection with the drawings to describe various features of embodiments of the present disclosure.

| | |
|---|---|
| 10: vehicle body | 20: door |
| 22: door end portion | 30: side outer panel |
| 32: storage side | 34: storage inner surface |
| 36: storage length surface | 38: side outer panel end portion |
| 40: drainage passage | 45: storage space |
| 50: side inner panel | 52: side inner panel end portion |
| 60: pillar portion | 62: pillar body |
| 64: pillar flange | 66: pillar mounting portion |
| 70: storage holder | 72: guide rail |
| 74: position fixing part | 80: holder portion |
| 82: upper holder | 84: holder ring |
| 90: lower holder | 92: holder body |
| 94: stopper hole | 96: stopper |
| 98: holder elastic portion | 100: funnel |
| 102: drain | 110: holder engage portion |
| 120: outer weather strip | 122: inner weather strip |
| 124: lower weather strip | 130, 132: umbrella |

DETAILED DESCRIPTION OF ILLUSTRATIVE EMBODIMENTS

Hereinafter, with reference to the accompanying drawings, embodiments of the present invention will be described in detail so that those skilled in the art can easily carry out embodiments of the present invention.

As those skilled in the art would realize, the described embodiments may be modified in various different ways, all without departing from the spirit or scope of embodiments of the present invention.

In order to clearly describe embodiments of the present invention, parts irrelevant to the description are omitted, and the same reference numerals are assigned to the same or similar components throughout the specification.

Since the size and thickness of each component shown in the drawings are arbitrarily shown for convenience of explanation, embodiments of the present invention are not necessarily limited to what is shown in the drawings, and the thickness is enlarged to clearly express various parts and areas.

Throughout the specification, when a part includes a certain component, this means that it may further include other components without excluding other components unless otherwise stated.

In addition, terms such as “unit” and “means” described in the specification mean a comprehensive unit of configuration that performs at least one function or operation.

When a part such as a layer, film, region, plate, etc. is said to be “on” another part, this includes not only the case of being directly on the other part, but also the case where there is another part in between.

In contrast, when an element is referred to as being “directly on” another element, there are no intervening elements present.

As used herein, ‘vehicle’, ‘vehicular’, ‘automotive’ or other similar terms as used herein generally refer to passenger vehicles, sports cars, sport utility vehicles (SUVs), buses, trucks, and various commercial vehicles including passenger automobiles, hybrid vehicles, electric vehicles, hybrid electric vehicles, electric vehicle-based PBVs (purpose built vehicles), hydrogen-powered vehicles, and other alternative fuel vehicles (e.g., other than petroleum fuel derived from resources).

Exemplary embodiments will hereinafter be described in detail with reference to the accompanying drawings.

Figure 2:
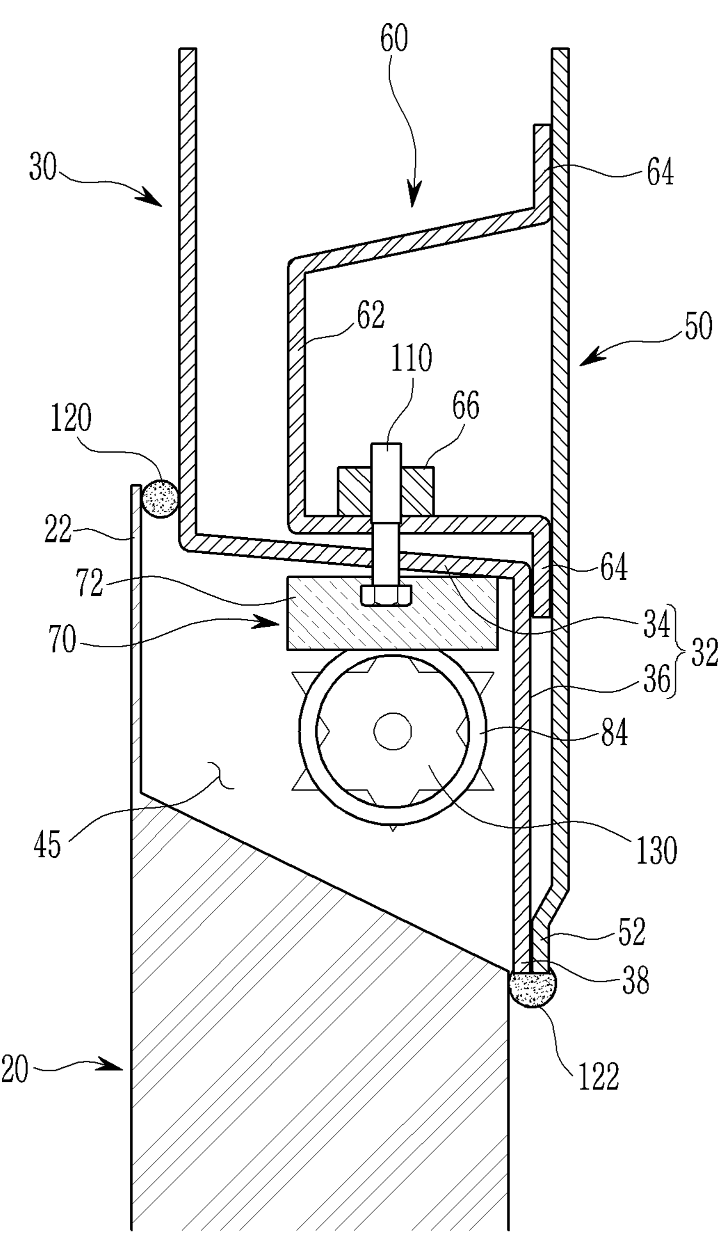
FIG. 2 and FIG. 3 are cross-sectional views along line II-II of FIG. 1 and show the operation of the door.
Figure 3:
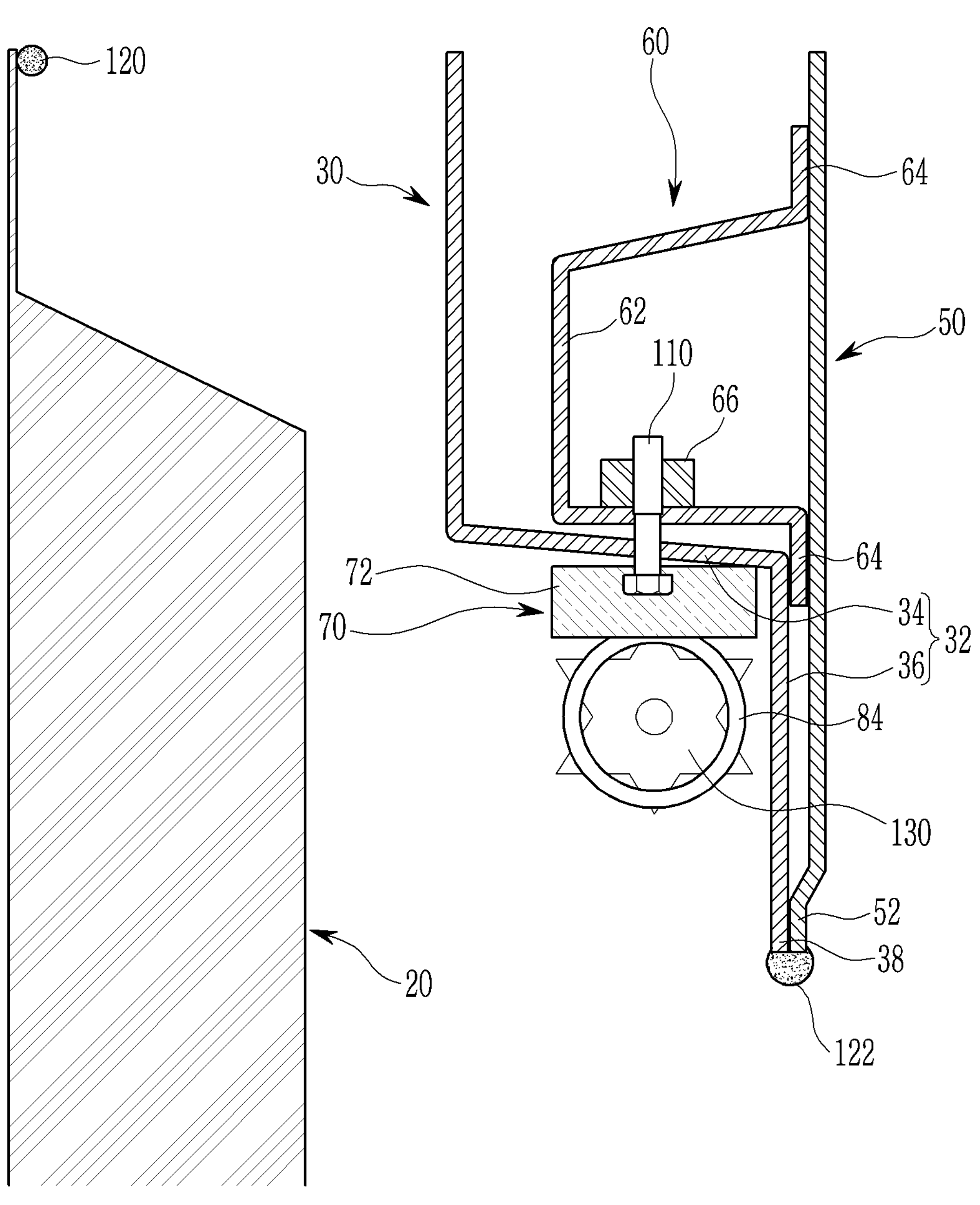

FIG. 1 is a partial perspective view of a vehicle provided with a storage space according to an exemplary embodiment of the present invention, and FIG. 2 and FIG. 3 are cross-sectional views along line II-II of FIG. 1 and show the operation of the door.

Referring FIG. 1 to FIG. 3, a vehicle provided with a storage space according to an exemplary embodiment may include a door 20 formed with a door end portion 22 extending in the length direction of a vehicle body 10 and a side outer panel 30 mounted on the outside of the vehicle body 10 and having a storage side 32 bent toward the inside of the vehicle body 10 to form a storage space 45.

For convenience of understanding, components such as the door 20 are omitted in FIG. 1.

The storage space 45 may be formed between the door end portion 22 and the storage side 32 when the door 20 is closed.

For example, the door 20 may be a sliding door as shown in the drawing, but is not limited thereto, and may be a door of various types.

That is, the vehicle provided with a storage space according to an exemplary embodiment is a vehicle on which the door 20 is mounted, the storage space 45 is formed between the door 20 and the vehicle body 10, and the inside of the vehicle where the occupant rides and the storage space 45 are separated to increase space utilization.

The storage side 32 may include a storage inner surface 34 curved inwardly of the vehicle body 10 and a storage length surface 36 curved from the storage inner surface 34 and formed in the length direction of the vehicle body 10.

The vehicle provided with a storage space according to an exemplary embodiment may include a side inner panel 50 mounted inside the vehicle body 10 and connected to the storage side 32.

The side inner panel 50 divides the interior space of the vehicle body 10 and is connected with the side outer panel 30 to increase the strength of the side of the vehicle body 10.

In addition, the vehicle provided with a storage space according to an exemplary embodiment may further include a pillar portion 60 mounted inside the side outer panel 30 and the side inner panel 50.

The pillar portion 60 forms a side frame of the vehicle body 10 and is mounted inside the side outer panel 30 and the side inner panel 50 to increase side strength of the vehicle body 10.

The pillar portion 60 may include a pillar body 62 curved in a shape to increase strength and may be connected to the side inner panel 50 through a pillar flange 64 curved from the pillar body 62.

For example, it can be connected with the side inner panel 50 by welding through the pillar flange 64 to increase the side strength of the vehicle body 10.

The vehicle provided with a storage space according to an exemplary embodiment may further include a storage holder 70 mounted on the storage side 32.

The storage holder 70 is a configuration for fixing objects stored in the storage space 45 and may prevent interference caused by movement of objects when the door 20 is opened and closed.

The storage holder 70 may be mounted on the pillar portion 60 through the storage side 32.

That is, the storage holder 70 may be mounted on the storage side 32 or mounted on a pillar mounting portion 66 formed on the pillar portion 60 through the holder engage portion 110.

For example, the holder engage portion 110 may be an engage bolt.

Figure 4:
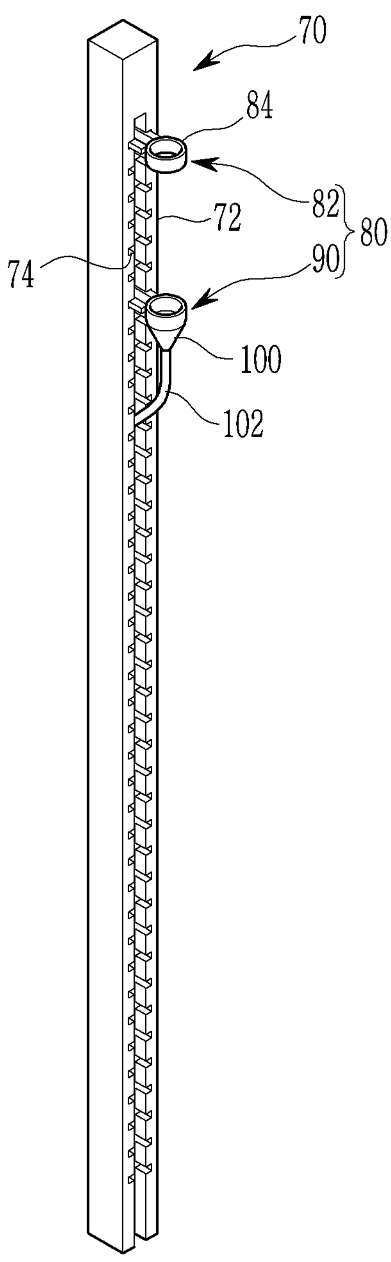
FIG. 4 is a perspective view of a storage holder that may be applied to a vehicle provided with a storage space according to an exemplary embodiment of the present invention.
Figure 5:
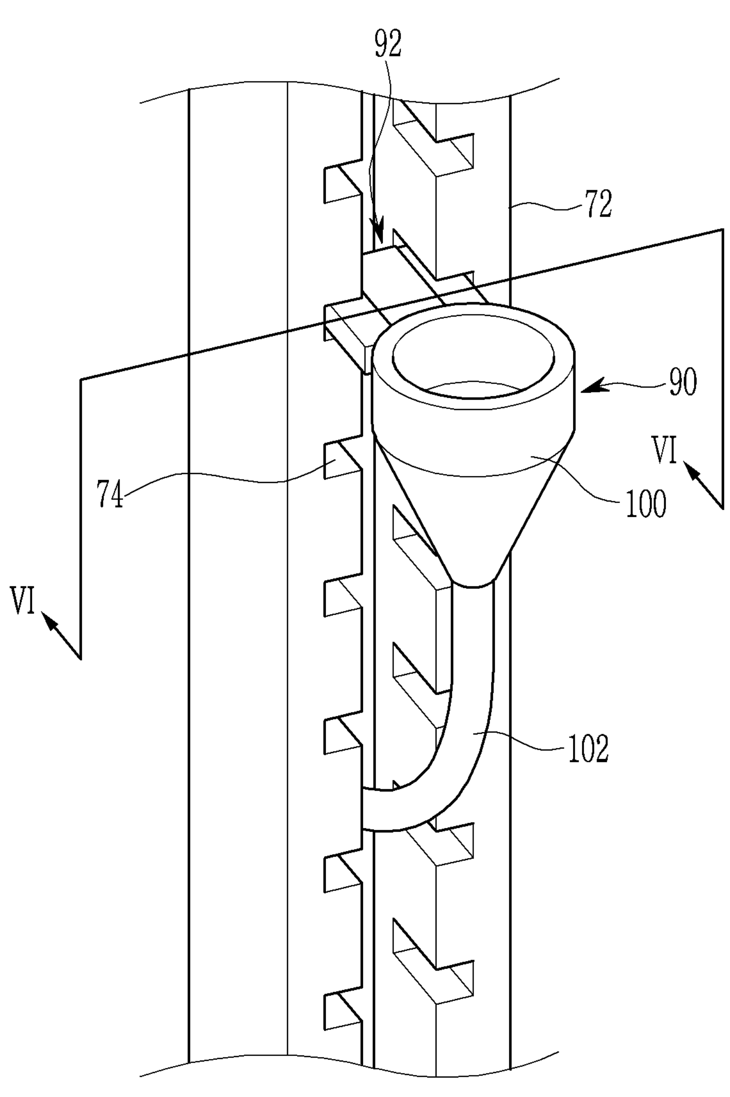
FIG. 5 is a perspective view of a lower holder that may be applied to a vehicle provided with a storage space according to an exemplary embodiment of the present invention.

FIG. 4 is a perspective view of a storage holder that may be applied to a vehicle provided with a storage space according to an exemplary embodiment of the present invention, and FIG. 5 is a perspective view of a lower holder that may be applied to a vehicle provided with a storage space according to an exemplary embodiment of the present invention.

Figure 6:
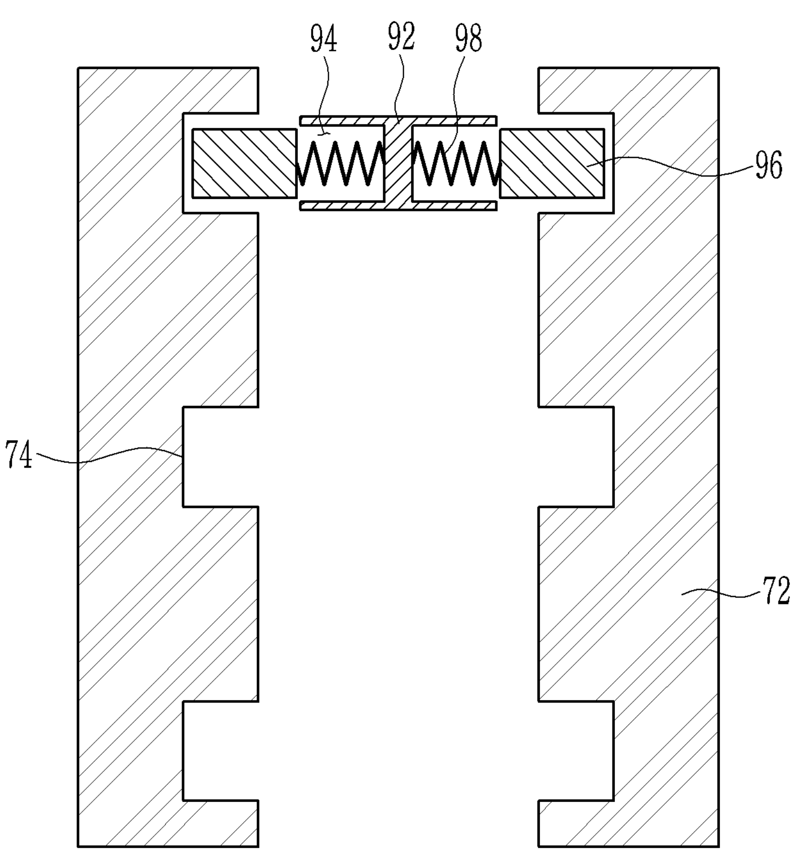
FIG. 6 is a cross-sectional view along line VI-VI of FIG. 5.
Figure 7A:
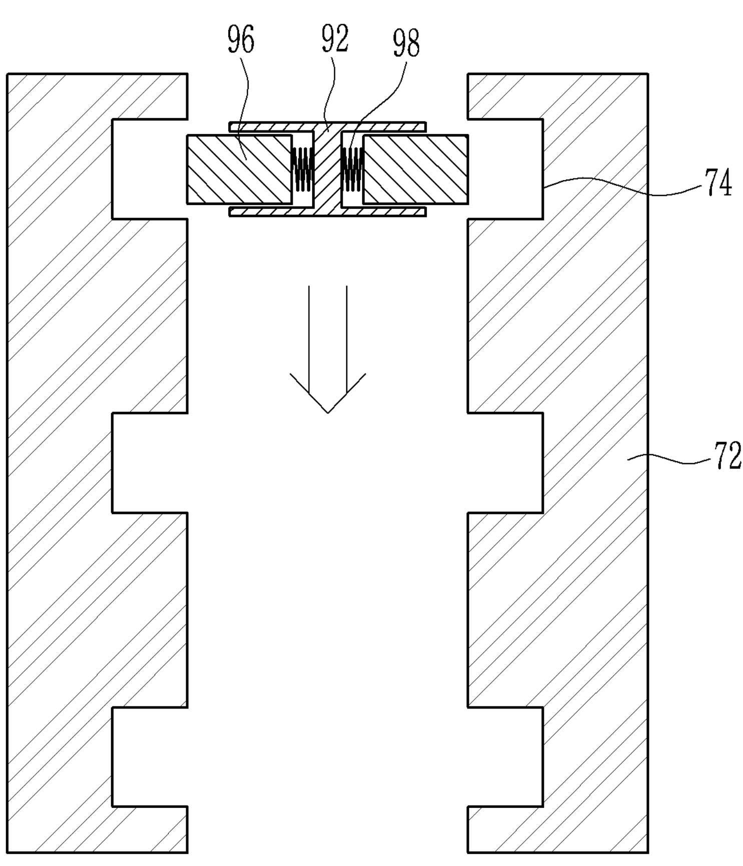
FIG. 7A and FIG. 7B are cross-sectional views showing the operation of a lower holder that may be applied to a vehicle provided with a storage space according to an exemplary embodiment of the present invention.
Figure 7B:
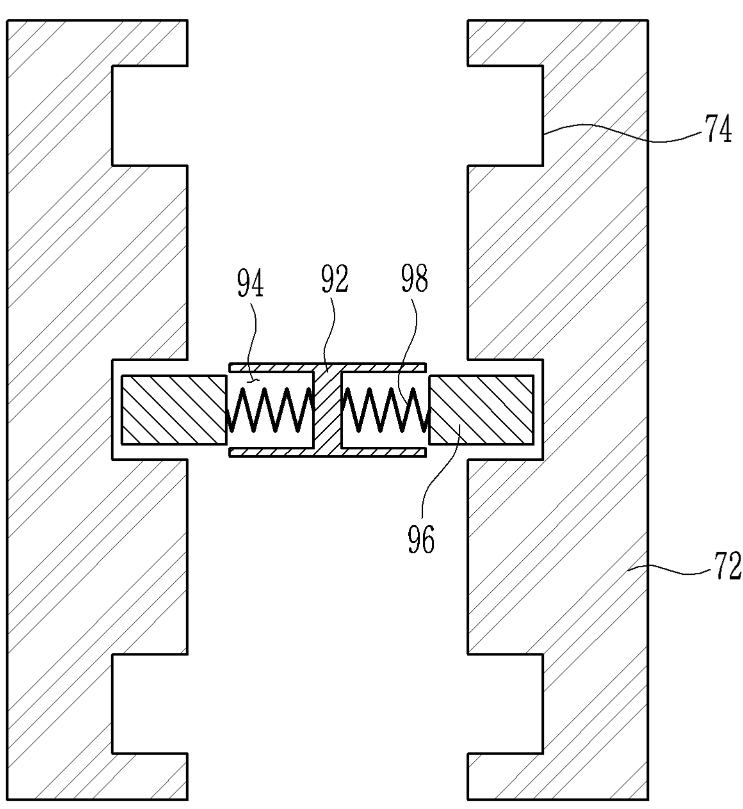

FIG. 6 is a cross-sectional view along line VI-VI of FIG. 5, and FIG. 7A and FIG. 7B are cross-sectional views showing the operation of a lower holder that may be applied to a vehicle provided with a storage space according to an exemplary embodiment of the present invention.

Figure 8:
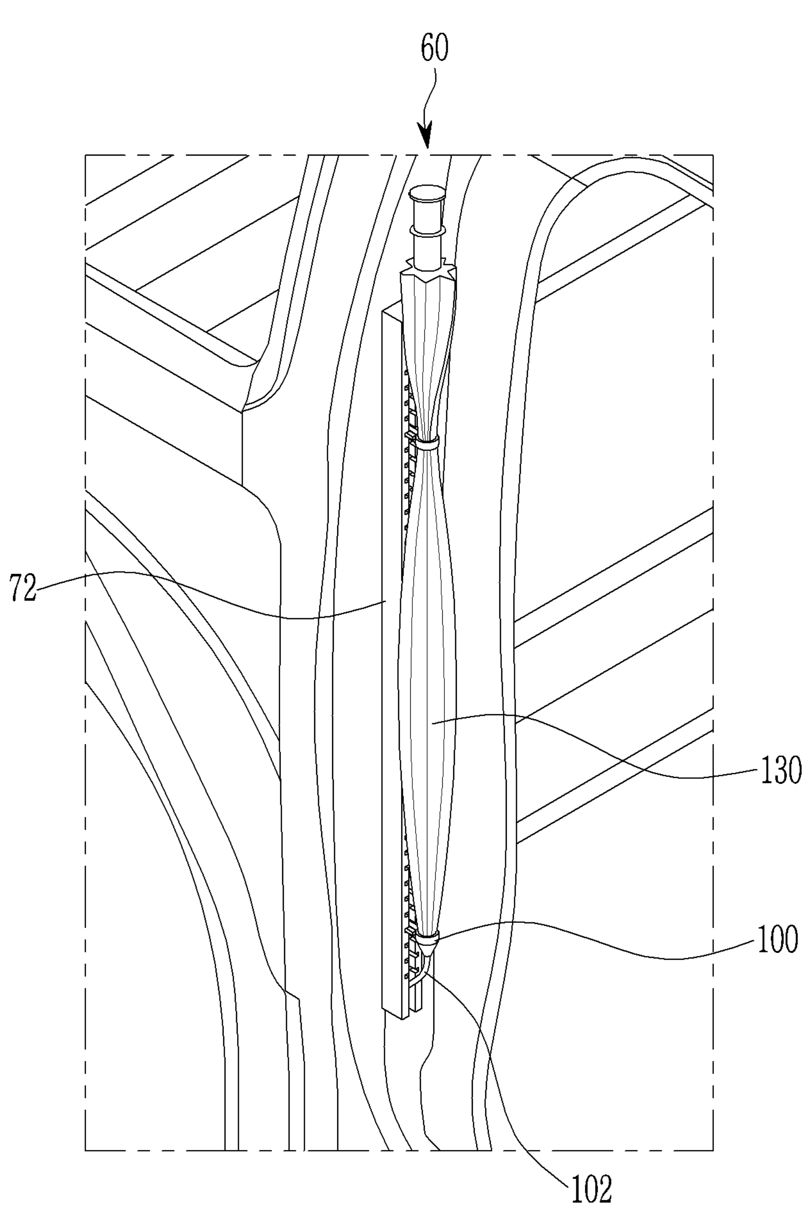
FIG. 8 and FIG. 9 are drawings showing an application example of a vehicle provided with a storage space according to an exemplary embodiment of the present invention.
Figure 9:
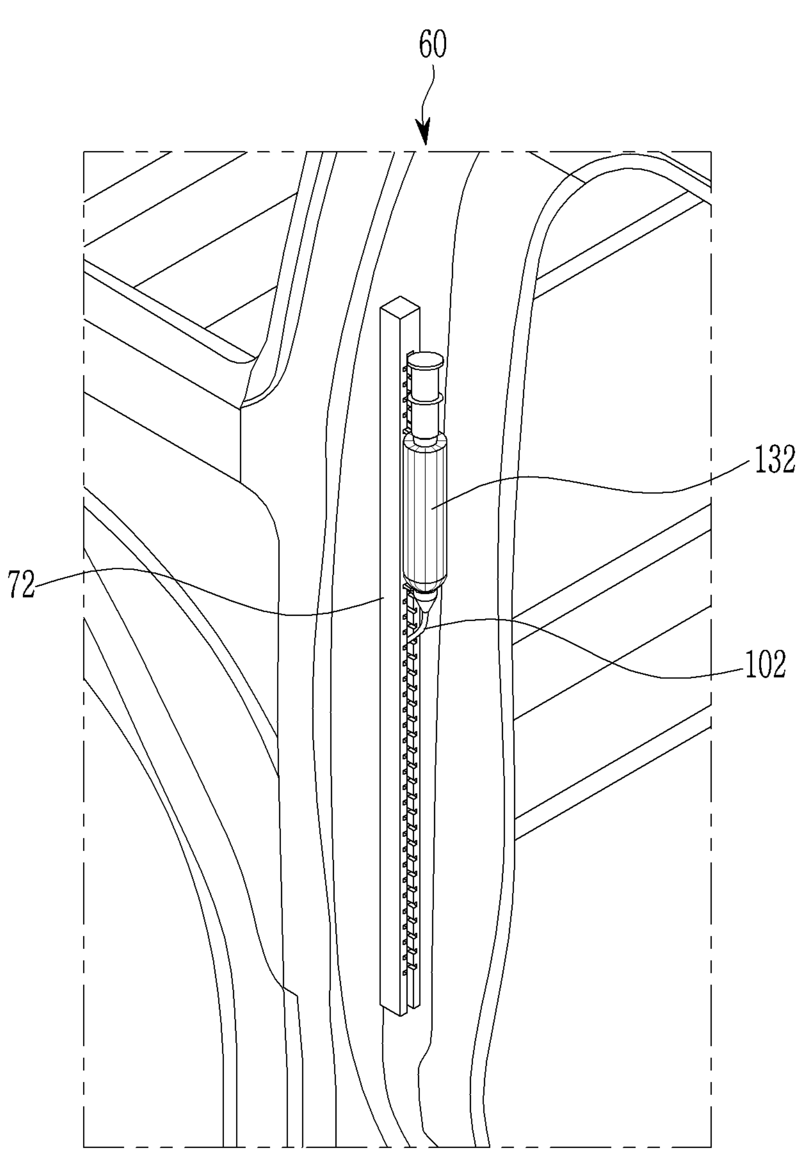

FIG. 8 and FIG. 9 are drawings showing an application example of a vehicle provided with a storage space according to an exemplary embodiment of the present invention.

Referring to FIG. 4 to FIG. 9, the storage holder 70 may be a storage holder 70 that mounts an umbrella.

The storage space 45 is a space between the storage side 32 of the side outer panel 30 and the door end portion 22 of the door 20 and is formed in the height direction of the vehicle body 10.

Therefore, the storage space 45 may accommodate relatively long-shaped objects to increase space utilization.

For example, relatively thin and long items such as walking sticks and climbing sticks may be stored.

In describing an exemplary embodiment, for convenience of understanding, the storage holder 70 is described assuming that the storage holder 70 mounts an umbrella, but it is not limited thereto.

The storage holder 70 may include a guide rail 72 mounted on the vehicle body 10 and a holder portion 80 mounted on the guide rail 72.

The storage holder 70 includes the guide rail 72, of which a position fixing part 74 is formed thereto, mounted on the vehicle body 10, and the holder portion 80 that is selectively fixed to the position fixing part 74.

The holder portion 80 may include an upper holder 82 on which a holder ring 84 is formed and a lower holder 90 on which a funnel 100 is formed.

An item, for example, an umbrella, may be inserted and fixed to the holder ring 84.

In addition, long-shaped objects such as climbing sticks may also be inserted and fixed into the holder ring 84.

Also, the funnel 100 of the lower holder 90 may support the item.

Referring to FIG. 5 and FIG. 6, the lower holder 90 may include a holder body 92 with a stopper hole 94 formed therein, a stopper 96, which is inserted into the stopper hole 94, selectively protruded and fixed to the position fixing part 74, and a holder elastic portion 98 that is inserted into the stopper hole 94 and elastically supports the stopper 96.

The lower holder 90 may promote user convenience by adjusting its mount position relative to the guide rail 72 to an appropriate position for the length of the stored object, for example, an umbrella.

The lower holder 90 may include a funnel 100 mounted on the holder body 92 and a drain 102 connected to the funnel 100.

By mounting the funnel 100 on the lower holder 90 and connecting the drain 102 to the funnel 100, the exhaust may be discharged to the outside of the vehicle, preventing inflow of rainwater inside the vehicle.

Referring to FIG. 7A to FIG. 9, items of various lengths, such as a long umbrella 130 or a foldable umbrella 132, may be mounted on the holder portion 80.

For example, as shown in FIG. 7A, while the user presses the stopper 96, the holder body 92 is moved to an appropriate position on the guide rail 72. After that, when the force pressing the stopper 96 is released, the stopper 96 is protruded by the elastic force of the holder elastic portion 98 and may be inserted into the position fixing part 74.

This allows the lower holder 90 to be fixed.

For better comprehension, it has been described as adjusting the position of the lower holder 90, but it is not limited thereto. That is, the upper holder 82 also may include the holder body 92 having the stopper hole 94 formed therein, the stopper 96 inserted into the stopper hole 94, selectively protruded and fixed to the position fixing part 74, and the holder elastic portion 98 that is inserted into the stopper hole 94 and supports the stopper 96 with elasticity.

The holder elastic portion 98 is a component that supports the stopper 96 with elasticity, for example, it may be a coil spring, but it is not limited thereto.

A drainage passage 40 may be formed on the side outer panel 30 to communicate with the drain 102 to exhaust water to the outside of the vehicle.

Figure 10:
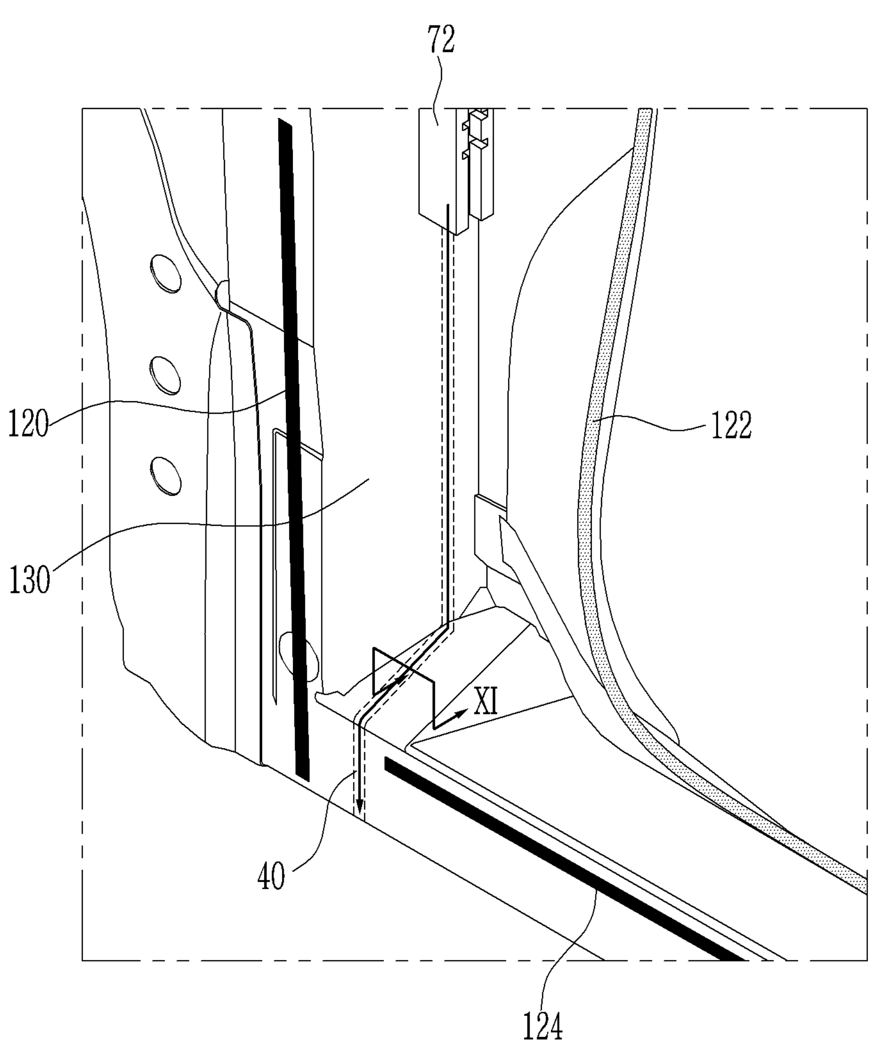
FIG. 10 is a partial perspective view of a vehicle provided with a storage space according to an exemplary embodiment of the present invention.
Figure 11:
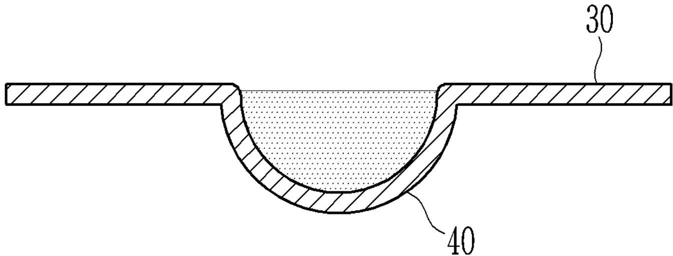
FIG. 11 is a cross-sectional view along line XI-XI of FIG. 10.

FIG. 10 is a partial perspective view of a vehicle provided with a storage space according to an exemplary embodiment of the present invention, and FIG. 11 is a cross-sectional view along line XI-XI of FIG. 10.

Referring to FIG. 2, FIG. 3, and FIG. 10, the vehicle provided with a storage space according to an exemplary embodiment may further include an outer weather strip 120 sealing between the door end portion 22 and the side outer panel 30.

The outer weather strip 120 prevents foreign objects from flowing between the door end portion 22 and the side outer panel 30 and absorbs the impact between the door end portion 22 and the side outer panel 30 when the door 20 is closed.

For example, the outer weather strip 120 is a material with elasticity and may be formed of a material such as rubber, silicone, or plastic.

Although the drawing shows that the outer weather strip 120 is mounted on the door end portion 22, it is not limited thereto and may be mounted on the side outer panel 30.

The vehicle provided with a storage space according to an exemplary embodiment may further include an inner weather strip 122 sealing between the inner end of the side outer panel 30 and the door 20.

The inner weather strip 122 can prevent foreign objects from flowing between the door 20 and the side outer panel 30 and absorb impact between the door 20 and the side outer panel 30 when the door 20 is closed.

For example, the inner weather strip 122 is a material with elasticity and may be formed of a material such as rubber, silicone, or plastic.

The inner weather strip 122 is mounted on the side outer panel end portion 38 of the side outer panel 30 and the side inner panel end portion 52 of the side inner panel 50, so that the inner weather strip 122 may suppress scratches and the like caused by the side outer panel end portion 38 and the side inner panel end portion 52 when the vehicle occupant gets on and off and improve the appearance of the vehicle.

In addition, the vehicle provided with a storage space according to an exemplary embodiment may further include a lower weather strip 124 sealing between the lower portion of the vehicle body 10 and the lower portion of the door 20.

The lower weather strip 124 may prevent inflow of foreign objects between the door 20 and the lower portion of the vehicle body 10 and may absorb impact between the door 20 and the vehicle body 10 when the door 20 is closed.

For example, the lower weather strip 124 is a material with elasticity and may be formed of a material such as rubber, silicone, or plastic.

Referring to FIG. 11, the drainage passage 40 formed on the side outer panel 30 may exhaust water to the outside of the vehicle and, for example, may be formed on the side outer panel 30 in the form of intaglio foaming.

The drainage passage 40 is formed between the outer weather strip 120 and the lower weather strip 124 to exhaust rainwater to the outside of the vehicle.

As described above, according to the vehicle provided with a storage space according to an exemplary embodiment, a storage space is formed in the vehicle between a door and a vehicle body, thereby increasing space utilization.

In addition, according to the vehicle provided with a storage space according to an exemplary embodiment, space utilization may be increased by storing an umbrella in the storage space, and an increase in humidity inside the vehicle may be suppressed.

While embodiments of the invention have been described in connection with what is presently considered to be practical exemplary embodiments, it is to be understood that the embodiments are not limited to the disclosed embodiments. On the contrary, they are intended to cover various modifications and equivalent arrangements included within the spirit and scope of the appended claims.

What is claimed is:

1. A vehicle comprising:
- a vehicle body;
- a door coupled to the vehicle body and comprising a door end portion extending in a length direction of the vehicle body;
- a side outer panel mounted on an outside of the vehicle body, the side outer panel comprising a storage side bent toward an inside of the vehicle body to define a storage space;
- a side inner panel mounted inside the vehicle body and connected to the storage side; and
- a pillar portion mounted between the side outer panel and the side inner panel,
- wherein the storage space is defined between the door end portion and the storage side in a state in which the door is closed.

2. The vehicle of claim 1, further comprising a storage holder mounted on the storage side.

3. A vehicle comprising:
- a vehicle body;
- a door coupled to the vehicle body and comprising a door end portion extending in a length direction of the vehicle body;
- a side outer panel mounted on an outside of the vehicle body, the side outer panel comprising a storage side bent toward an inside of the vehicle body to define a storage space;
- a side inner panel mounted inside the vehicle body and connected to the storage side;
- a pillar portion mounted between the side outer panel and the side inner panel; and
- a storage holder mounted on the pillar portion through the storage side,
- wherein the storage space is defined between the door end portion and the storage side in a state in which the door is closed.

4. The vehicle of claim 2, wherein the storage holder is configured to hold an elongated object.

5. The vehicle of claim 2, wherein the storage holder is configured to hold an umbrella, a walking stick, or a cane.

6. The vehicle of claim 2, wherein the storage holder comprises:
- a guide rail comprising a position fixing part mounted on the vehicle body; and
- a holder portion selectively fixed to the position fixing part.

7. The vehicle of claim 6, wherein the holder portion comprises:
- an upper holder;
- a holder ring provided on the upper holder;
- a lower holder; and
- a funnel provided on the lower holder.

8. The vehicle of claim 1, further comprising a drainage passage provided on the side outer panel and configured to exhaust water to the outside of the vehicle body.

9. The vehicle of claim 1, further comprising an outer weather strip configured to seal between the door end portion and the side outer panel.

10. The vehicle of claim 1, further comprising an inner weather strip configured to seal between an inner end of the side outer panel and the door.

11. The vehicle of claim 1, further comprising a lower weather strip configured to seal between a lower portion of the vehicle body and a lower portion of the door.

12. A method for providing a storage space in a vehicle, the method comprising:
- providing a door comprising a door end portion that extends in a length direction of the vehicle;
- providing a side outer panel mounted on an outside of the vehicle, the side outer panel comprising a storage side bent toward an inside of the vehicle to define the storage space;
- providing a side inner panel mounted inside the vehicle and connected to the storage side;
- providing a pillar portion mounted between the side outer panel and the side inner panel; and
- providing a storage holder mounted on the storage side.

13. The method of claim 12, wherein the storage space is defined between the door end portion and the storage side in a state in which the door is closed.

14. The method of claim 12, wherein the storage holder is mounted on the pillar portion through the storage side.

15. The method of claim 12, wherein the storage holder is configured to mount an umbrella, a walking stick, or a cane.

16. The method of claim 12, wherein the storage holder comprises:
- a guide rail comprising a position fixing part mounted on the vehicle; and
- a holder portion selectively fixed to the position fixing part, wherein the holder portion comprises:
  - an upper holder;
  - a holder ring provided on the upper holder;
  - a lower holder; and
  - a funnel provided on the lower holder.

17. The method of claim 12, further comprising:
- providing a drainage passage on the side outer panel to exhaust water to the outside of the vehicle;
- providing an outer weather strip to seal between the door end portion and the side outer panel;

providing an inner weather strip to seal between an inner end of the side outer panel and the door; and providing a lower weather strip to seal between a lower portion of the vehicle and a lower portion of the door.

18. The method of claim 12, wherein the storage holder is configured to hold an elongated object.

19. The vehicle of claim 3, wherein the storage holder is configured to hold an elongated object.

20. The vehicle of claim 3, wherein the storage holder comprises:

a guide rail comprising a position fixing part mounted on the vehicle body; and a holder portion selectively fixed to the position fixing part, wherein the holder portion comprises:

an upper holder, a holder ring provided on the upper holder, a lower holder, and a funnel provided on the lower holder.

* * * * *